United States Patent
Yang (12)

(10) Patent No.: US 6,273,927 B1
(45) Date of Patent: Aug. 14, 2001

(54) MANUFACTURING METHOD OF FERTILIZER MADE FROM ORGANIC WASTES

(76) Inventor: Dae Youn Yang, 103-106, Banchun Hyundae APT, 1023-51, Banchunri, Unyang-up, Ulji-gun, Ulsan (KR)

( * ) Notice: Subject to any disclaimer, the term of this patent is extended or adjusted under 35 U.S.C. 154(b) by 0 days.

(21) Appl. No.: 09/572,310

(22) Filed: May 18, 2000

(51) Int. Cl.⁷ .............................. C05F 3/04; C05F 11/02
(52) U.S. Cl. ....................... 71/11; 71/14; 71/15; 71/16; 71/23; 71/61; 71/62; 71/63; 71/901
(58) Field of Search ................... 71/11, 15, 16, 71/14, 23, 63, 61, 62, 901

(56) References Cited

U.S. PATENT DOCUMENTS 3,865,568 * 2/1975 Kratzer ...................................... 71/21
6,193,776 * 2/2001 Doetsch et al. ........................... 71/63

FOREIGN PATENT DOCUMENTS

3614183 * 11/1987 (DE) .

* cited by examiner

*Primary Examiner*—Chhaya D. Sayala
(74) *Attorney, Agent, or Firm*—Jacobson Holman, PLLC

(57) ABSTRACT

This invention relates to a method of manufacturing the fertilizer made from organic wastes such as food wastes, human excrements, animal excrements, slaugterhouse waste, henhouse waste, fish and shellfish wastes, vegetable wastes and agricultural wastes. Various wastes are mixed and crushed into certain sizes, processes for adjusting the water content, put into the treating tank and digested by mixing a calcined lime. The present invention utilizes a dolomite or mixture of calcined lime and dolomite to provide the first treatment material. This first treatment material is mixed with the supplement material such as charcoal, saw dust, loess, zoelite, chaff, or shell powder to give compost fertilizer. It is also mixed with agricultural products such a watermelons or melons which ferment to provide a special fertilizer for the agricultural product. The treatment material can be added to water and mixed with mugwort, medicinal herb, zeolite, loess, and then extracted to provide a liquid fertilizer. As the various organic wastes are changed to organic fertilizer, the acidified soil is improved, the environmental contamination can be prevented, and the high moisturizing and the fine porous of the soil prevent drought and fertilizer loss so as to raise fertilizing efficiency.

3 Claims, 3 Drawing Sheets

MANUFACTURING METHOD OF FERTILIZER MADE FROM ORGANIC WASTES

BACKGROUND OF THE INVENTION

1. Field of the Invention

This invention relates to a method of manufacturing fertilizers such as a compost organic fertilizer, an organic fertilizer for a special crop or a liquid fertilizer, wherein various organic wastes are reacted with a natural digestant such as a calcined lime or a dolomite to give the first treatment material which can be used for a fertilizer source.

As the compost organic fertilizer manufactured according to the present invention includes an organic fertilizer for a special crop and a liquid fertilizer, it can be used for rising the farmcrops productivity by neutralizing the acidified soil property as to be alkalic and improving the soil property to the high fertility.

Also, the organic wastes used in this invention includes all organic wastes which can be occurred in our life environment such a food wastes, various organic wastes occurred in a slaughterhouse and a henhouse, human excrements, animal excrements, vegetable wastes or agricultural wastes.

The present invention manufactures an organic fertilizer like a barnyard manure by following methods: The organic wastes is gathered to be processed for a treatment and then putted into a treating tank, wherein natural digestants such as a calcine lime or a dolomite are used for digestion in single or in combination to remove the toxicity of organic wastes, and to sterilize and deodorize the organic wastes which is changed into a fertilizer source;

To the first treatment material for a fertilizer source, a loess, a zeolite, a saw dust, a chaff, a grass cutting material and like are added and mixed to be fermented; agricultural products such a watermelon, a melon, a cucumber or a tomato which are to be abandoned because is has no value as commodities are gathered, finely cut, mixed with the fertilizer source and fermented; Chinese crude drugs such as a mugwort or a medicinal herb are mixed to the fertilizer source with a supplement material and a raw water is added thereto, the mixed material is ripened for a considerable period and then it is squeezed to make a liquid fertilizer; or the treating material remained after manufacturing the fertilizer as the above process is fermented by adding the supplement material such as a charcoal, saw dust, shell powder to give an organic fertilizer like a barnyard manure.

As known, a calcined lime is the usual name of calcium oxide and it is obtained by burning limestone or hydroxide but if it contacts with water it is to be calcium hydroxide with high heat, that is, it has a natural digestive function (a calcined lime is changed by adding water to calcium hydroxide), therefore, if organic wastes are treated by utilizing the function, the organic wastes are hydrolyzed to be digested in a treating tank so that without a separate drug the toxicity thereof is neutralized, it is sterilized and is deodorized.

As the dolomite is a carbonate mineral which is called as a baekoonsuk or kohoysuk, it is the double salt of $CaCO_3$ and $MgCO_3$ and is presented as common fabrication, granular and granule compact. Beside, since it has a high magnesium content and is alkalic, if it is mixed and reacted with organic wastes which have high moisture, it shows the digestive function with high heat to neutralize the toxicity of organic wastes and sterilize the organic wastes with removing the odor, therefore, it digests organic wastes to be a fertilizer source.

The present invention is characterized in that by using the above methods organic wastes is changed to be a fertilizer.

2. Description of the Prior Art

In our life environment, preposterous organic wastes related to our life are occurred but it is organic substance so that it is easy to be decomposed. Therefore, the bad smell and the toxin generated during the decomposition give a damage to our life.

However, for treating that, a considerable expense has been spent but the effective treating method has been not developed, besides, because of many wastes abandonment or discharge, the life environment has been contaminated to cause diseases.

Simultaneously, the oxidation in our land is promoted due to the abuse of chemical fertilizer so that the fertility of soil is diminished to fall down the productivity thereof.

SUMMARY OF THE INVENTION

This invention is designed to solve the problems faced to the realities of life, the object of the invention is to provide a method of manufacturing organic fertilizers suited for purpose, wherein preposterous organic wastes are reacted with a natural digestant, i.e., a mineral material such as a calcined lime or a dolomite to neutralize the toxicity and remove the odor with sterilizing therein so as to give the fertilizer source, and then, the special supplement material is added thereto for the secondary processing.

DETAIL DESCRIPTION OF THE INVENTION

Figure 1:
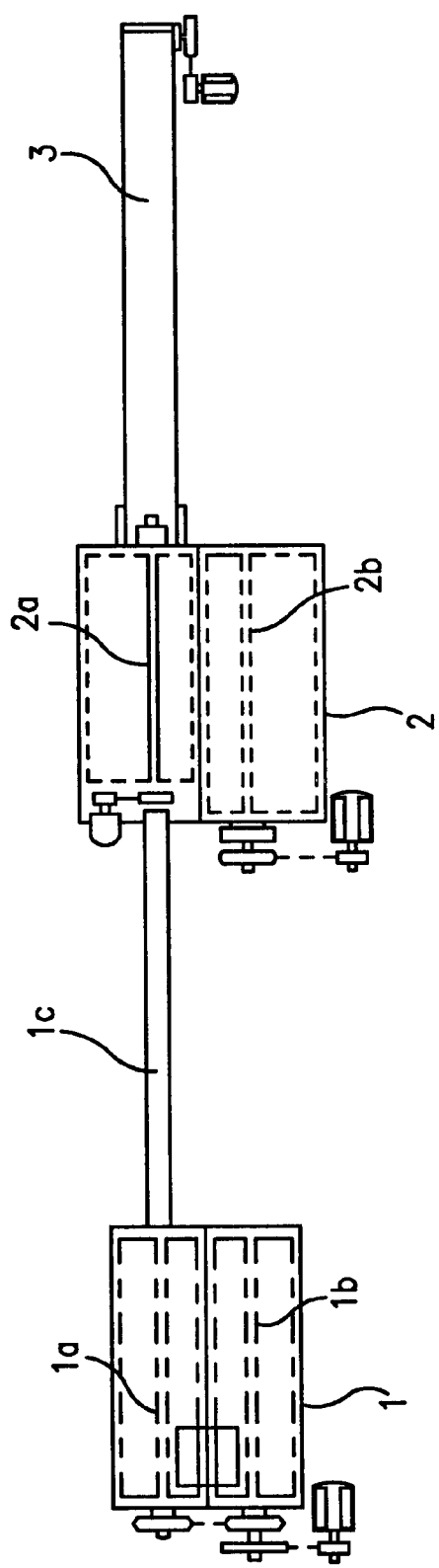
FIG. 1 is an exemplary view of the manufacturing device according to the present invention, seen from the top.
Figure 2:
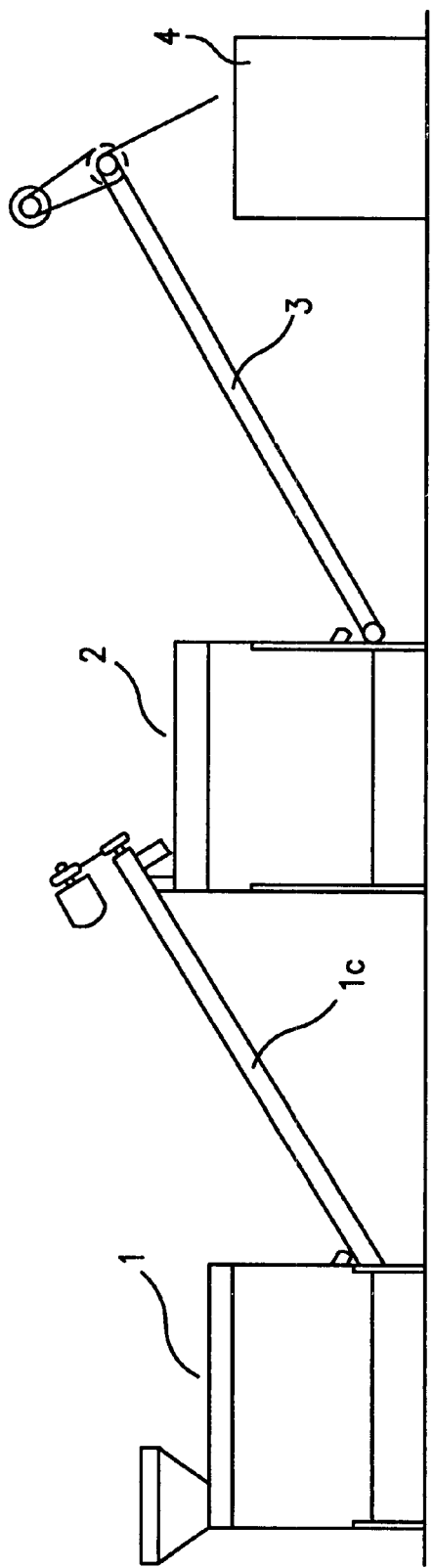
FIG. 2 is a front view of FIG. 1.
Figure 3:
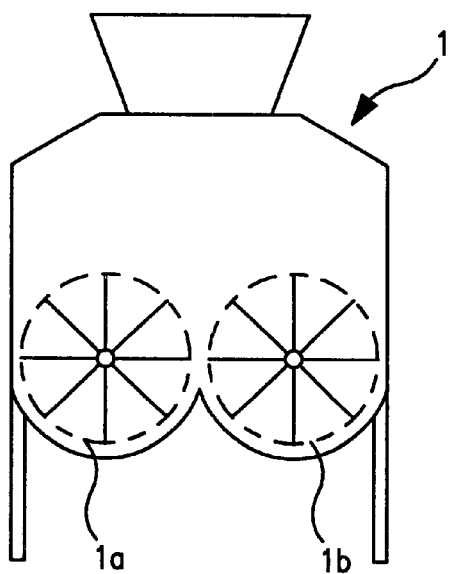
FIG. 3 is an exemplary side view of the first treating tank.
Figure 4:
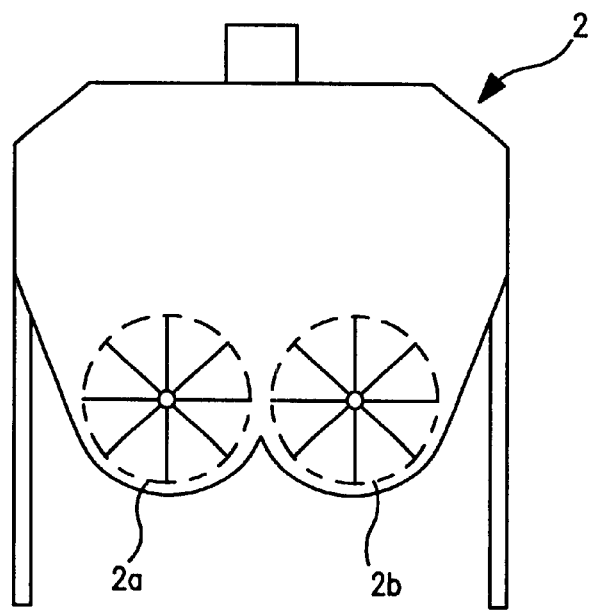
FIG. 4 is an exemplary side view of the second treating tank.

The present invention provides the fertilizer source which can be used in manufacturing fertilizers: wherein various organic wastes described in above are gathered according to the type thereof, crushed or mixed to be processed into good state for treating and to have moisture in 60~80% thereof, and then the mixture is put into the treating tank 1 and reacted by a natural digestant, that is, the organic wastes contacts with the digestant to be digested simultaneously with being hydrolyzed in the treating tank, therefore, the toxicity of the organic wastes is neutralized; the organic wastes are sterilized; and the odor of the organic wastes is removed, that is, the first treatment is accomplished to provide the fertilizer source which can be used in manufacturing the fertilizers.

At this time, as the natural digestant used for a digesting, a calcined lime or a dolomite is used For that, the present invention uses the treating tank 1 in which a pair of screw type stirring conveyor 1a is installed to complete the treatment in 1~2 hours. The amount of the digestant used at that time is preferably 30~50 weight %.

The first treatment material digested as above is taken by the following treatment according to the purpose of the fertilizer to provide the organic fertilizer.

1) The first treatment material is put into the second treating tank 2 and mixed with zeolite 5%, loess 5%, saw dust 10%, chaff 10%, grass powder 20% and stirred for 20~40 minutes, and then it is extracted to be fermented artificially in a fermentation chamber for 10~15 days to provide the compost fertilizer.

2) The first treatment material is put into the second treating tank 2, the cutting material of agriculture products is added 20 weight % to the whole amount and stirred for 20~40 minutes and extracted to be fermented artificially in a fermentation for 5~15 days to give the special organic fertilizer for a watermelon, a melon, a cucumber, a carrot, a tomato and a pepper, the agriculture products being a watermelon, a melon, a cucumber, a carrot, a tomato, a pepper and like which are abandoned due to the valuelessness as a commodity.

3) The first treatment material is put into the second treating tank 2, the raw water is poured thereto, charcoal 5%, mugwort 5%, medicinal herb crushing material 20%, zeolite 5% and loess 5% are mixed therewith and stirred for 20~40 minutes, and then the mixture if ripened in the storage tank 4 for 2~3 days, and then the ripened material is extracted and the juice thereof is precipitated to give a liquid fertilizer, the remained treatment is mixed with the additive 10 weight % such as shell powder to be fermented artificially about 10 days to provide the compost organic fertilizer.

The fertilizer of the present invention manufactured according to the above methods has merits: since the organic wastes are reacted with the organic digestant, i.e., a calcine lime or a dolomite to be digested, without drugs, the toxicity and the odor of the organic material are removed and also the sterilization source is accomplished to provide the fertilizer source so that the safe fertilizer source can be manufactured at low expenses; and in such fertilizer source, the salt is removed, various heavy metal and hazard bacteria are destructed, and organic substance is rich, therefore it can become the fertilizer which can plant consequently because it has high effectiveness in manufacturing the barnyard manure, the special fertilizer for a protected agriculture, the liquid fertilizer, the organic fertilizer. As using the fertilizer, the acidic soil can be improved and the good crops can be produced, whereby the environment attractive organic agriculture can be nurtured.

Therefore, as the present invention has been developed, all organic wastes are quickly treated in large quantities without any chemicals to be the organic fertilizer so that the high value-added wastes treatment become possible to maximize the economic efficiency and the profitability. Also, the environment deterioration during the treating process can be prevented and the waste water is not occurred, therefore, the invention is environment-attractive, and it can minimize the treating expense and develop the related industries.

Particularly, the zeolite is microporous ($2000m^2/g$) and has the water and the fertilizer component which is slowly discharged, that is, it has the moisturizing and the fertilizing function so that the drought damage and the fertilizer loss can be prevented. Besides, since it has the special effect such as the progress of the air permeability, it can give the substantial help.

What is claimed is:

1. A method of manufacturing a fertilizer made from organic wastes characterized in that the organic wastes selected from the group consisting of food wastes, human excrements, animal excrements, wastes of a slaughterhouse, a henhouse, fish wastes, shellfish wastes, vegetable wastes, agricultural wastes or mixture thereof with a moisture content of 60–80%, are put into a first treating tank and reacted by adding a digestant selected from calcined lime or dolomite to provide a fertilize source, the fertilizer source obtained from the first treatment is put into a second treating tank, mixed with zeolite 5%, loess 5%, saw dust 10%, chaff 10%, grass powder 20% and extracted to be fermented to provide a compost fertilizer; or the fertilizer source obtained from the first treatment is put into the second treating tank, mixed with 20% of chopped agricultural products selected from the group consisting of watermelon, melon, cucumber, carrot, tomato and pepper, transferred to a fermentation chamber, and then fermented artificially to provide a organic fertilizer for special crops; or the fertilizer source obtained from the first treatment is put into the second tank, extracted after adding charcoal 5%, mugwort 5%, medicinal herb crushing material 20%, zeolite 5%, loess 5% and water, fermented to provide the liquid fertilizer; and after manufacturing the compost fertilizer or the organic fertilizer or the liquid fertilizer, the residue thereof is mixed with zeolite or shell powder to be fermented to produce an organic fertilizer used as barnyard manure.

2. The method of manufacturing a fertilizer made from organic wastes as claimed in claim 1, characterized in that said digestant is a calcined lime and the amount thereof is 30~50 weight % of the amount of the organic wastes.

3. The method of manufacturing a fertilizer made from organic wastes as claimed in claim 1, characterized in that said digestant is a dolomite and the amount thereof is 30~50 weight % of the amount of the organic wastes.

* * * * *